(12) United States Patent
Teshima

(10) Patent No.: US 10,969,949 B2
(45) Date of Patent: Apr. 6, 2021

(54) INFORMATION DISPLAY DEVICE, INFORMATION DISPLAY METHOD AND INFORMATION DISPLAY PROGRAM

(71) Applicant: Panasonic Intellectual Property Management Co., Ltd., Osaka (JP)

(72) Inventor: Hiroki Teshima, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 1008 days.

(21) Appl. No.: 14/542,728

(22) Filed: Nov. 17, 2014

(65) Prior Publication Data

US 2015/0074573 A1 Mar. 12, 2015

Related U.S. Application Data

(63) Continuation of application No. PCT/JP2013/007544, filed on Dec. 24, 2013.

(30) Foreign Application Priority Data

Aug. 21, 2013 (JP) .............................. JP2013-171042

(51) Int. Cl.
*G06F 3/0484* (2013.01)
*G06F 3/0488* (2013.01)

(52) U.S. Cl.
CPC ...... *G06F 3/04847* (2013.01); *G06F 3/04845* (2013.01); *G06F 3/04883* (2013.01)

(58) Field of Classification Search
CPC ........ G01C 21/00; G01C 21/367; G06F 3/048
See application file for complete search history.

(56) References Cited

U.S. PATENT DOCUMENTS 5,345,543 A 9/1994 Capps et al.
5,542,003 A * 7/1996 Wofford .................... G06T 5/40
345/660

(Continued)

FOREIGN PATENT DOCUMENTS

CN 102473322 A 5/2012
JP 2011-039689 A 2/2011

(Continued)

OTHER PUBLICATIONS

Form PCT/ISA/237 for corresponding International Application No. PCT/JP2013/007544 dated Apr. 1, 2014 and partial English translation.

(Continued)

*Primary Examiner* — Jennifer N To
*Assistant Examiner* — Qi Wan
(74) *Attorney, Agent, or Firm* — Renner, Otto, Boisselle & Sklar, LLP

(57) ABSTRACT

An information display device includes an input interface that accepts an input manipulation including setting a starting location and a destination, and a processor that displays in a display area, an object and a manipulator for use to enter an instruction to change the display state of the object. The processor changes the display state in accordance with a vector to be defined by the distance and direction from the starting location to the destination. The processor performs a first type of processing in response to the input manipulation done on a region other than a region of the manipulator, and a second type of processing of changing the display state in response to the input manipulation done on the region of the manipulator. In the second type of processing, the display state of the object can be changed more finely than in the first type of processing.

12 Claims, 11 Drawing Sheets

(56) References Cited

U.S. PATENT DOCUMENTS

| | | | |
|---|---|---|---|
| 5,644,689 A | 7/1997 | Ban et al. | |
| 5,870,090 A * | 2/1999 | Takai | G06F 3/04842 715/788 |
| 8,310,446 B1 * | 11/2012 | Owen | G06F 3/0481 345/157 |
| 2003/0018427 A1 * | 1/2003 | Yokota | G01C 21/367 701/455 |
| 2004/0164956 A1 | 8/2004 | Yamaguchi et al. | |
| 2005/0007382 A1 * | 1/2005 | Schowtka | G06T 3/40 345/619 |
| 2008/0062001 A1 * | 3/2008 | Hsu | G06F 1/1626 340/689 |
| 2010/0329426 A1 * | 12/2010 | Oda | A61B 6/4283 378/98.2 |
| 2011/0050566 A1 | 3/2011 | Sawai | |
| 2012/0030635 A1 * | 2/2012 | Miyazaki | G06F 3/0482 715/863 |
| 2012/0054612 A1 * | 3/2012 | Bok | G06F 3/0488 715/716 |
| 2012/0092530 A1 * | 4/2012 | Oba | H04N 5/23245 348/240.2 |
| 2012/0098992 A1 * | 4/2012 | Hosoe | G06K 9/00255 348/222.1 |
| 2012/0139915 A1 | 6/2012 | Muikaichi et al. | |
| 2012/0180000 A1 | 7/2012 | Weng et al. | |
| 2013/0159936 A1 | 6/2013 | Yamaguchi et al. | |
| 2013/0207892 A1 * | 8/2013 | Kim | G06F 3/033 345/157 |
| 2013/0283205 A1 * | 10/2013 | Suzuno | G01C 21/367 715/784 |
| 2014/0005931 A1 * | 1/2014 | Ono | G01C 21/00 701/445 |
| 2014/0028864 A1 * | 1/2014 | Tsubusaki | H04N 5/23245 348/208.12 |
| 2014/0368719 A1 * | 12/2014 | Kaneko | H04N 5/23216 348/333.02 |

FOREIGN PATENT DOCUMENTS

| | | |
|---|---|---|
| JP | 2011-048525 A | 3/2011 |
| JP | 2001-325608 A | 11/2011 |
| JP | 2013-097519 A | 5/2013 |
| WO | WO 2012/026730 A2 | 3/2012 |

OTHER PUBLICATIONS

Chinese Search Report with English translation for corresponding Chinese Application No. 201380074032.X dated Feb. 24, 2018.

* cited by examiner

INFORMATION DISPLAY DEVICE, INFORMATION DISPLAY METHOD AND INFORMATION DISPLAY PROGRAM

This is a continuation of International Application No. PCT/JP2013/007544, with an international filing date of Dec. 24, 2013, which claims priority of Japanese Patent Application No. 2013-171042, filed on Aug. 21, 2013, the contents of which are hereby incorporated by reference.

BACKGROUND

1. Technical Field

The present disclosure relates to an information display device, information display method and information display program for displaying an object in a changeable state.

2. Description of the Related Art

A technique for displacing an object being displayed on a display screen with the movement of a user's finger on the display screen is already known. For example, Japanese Laid-Open Patent Publication No. 2011-48525 discloses an information processing apparatus which includes a detecting section which detects the direction and amount of a finger's movement across a view plane, and a movement control section which changes the amount of movement of the object being displayed on a display section per unit amount of movement of the finger according to the direction of movement of the finger.

SUMMARY

According to the conventional technique, however, it is difficult to perform a fine manipulation accurately on an object being displayed.

The present disclosure provides an information display device, information display method and information display program which makes it easier for the user to perform a fine manipulation accurately on an object being displayed.

To overcome the problems described above, an information display device according to an aspect of the present disclosure includes: a processor which displays, in a display area of a display screen, an object, of which the display state is changeable, and a manipulator including a plurality of markers for use to enter an instruction to change the display state of the object; and an input interface which accepts an input manipulation, including setting a starting location and a destination, in the display area of the display screen. The processor changes the display state of the object in accordance with a vector to be defined by the distance and direction from the starting location to the destination. The processor is configured to be able to perform a first type of processing of changing the display state of the object in response to the input manipulation that has been done on at least a region of the display area of the display screen other than a region where the manipulator is shown and a second type of processing of changing the display state of the object in response to the input manipulation that has been done on the region where the manipulator is shown. When performing the second type of processing, the processor changes, in response to the input manipulation that has been done to define the same vector, the display state of the object more finely than when performing the first type of processing.

An information display device according to another aspect of the present disclosure includes: a processor which displays, in a display area of a display screen, an object, of which the display state is changeable, and a manipulator including a plurality of markers for use to enter an instruction to change the display state of the object; and an input interface which accepts an input manipulation, including setting a starting location and a destination, in the display area of the display screen. The processor changes the display state of the object in accordance with a vector to be defined by the distance and direction from the starting location to the destination. The processor is configured to operate in a first mode in which the manipulator is hidden from the display area and in a second mode in which the manipulator is shown in the display area. If processing of changing the display state of the object in response to the input manipulation that has been done in the first mode is called a first type of processing and if processing of changing the display state of the object in response to the input manipulation that has been done on a region of the display area where the manipulator is shown in the second mode is called a second type of processing, when performing the second type of processing, the processor changes, in response to the input manipulation that has been done to define the same vector, the display state of the object more finely than when performing the first type of processing.

An information display device, information display method and information display program according to the present disclosure contributes effectively to performing a fine manipulation accurately on an object being displayed.

These general and specific aspects may be implemented using a system, a method, and a computer program, and any combination of systems, methods, and computer programs.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

DETAILED DESCRIPTION

Embodiments will now be described in detail with reference to the accompanying drawings as needed. It should be noted that the description thereof will be sometimes omitted unless it is absolutely necessary to go into details. For example, description of a matter that is already well known in the related art will be sometimes omitted, so will be a redundant description of substantially the same configuration. This is done solely for the purpose of avoiding redundancies and making the following description of embodiments as easily understandable for those skilled in the art as possible.

It should be noted that the applicant of the present application provides the accompanying drawings and the following description to help those skilled in the art understand the present disclosure fully. And it is not intended that the subject matter defined by the appended claims is limited by those drawings or the description.

Embodiment 1

A first embodiment will now be described with reference to the accompanying drawings.

[1-1. Configuration]

Figure 1:
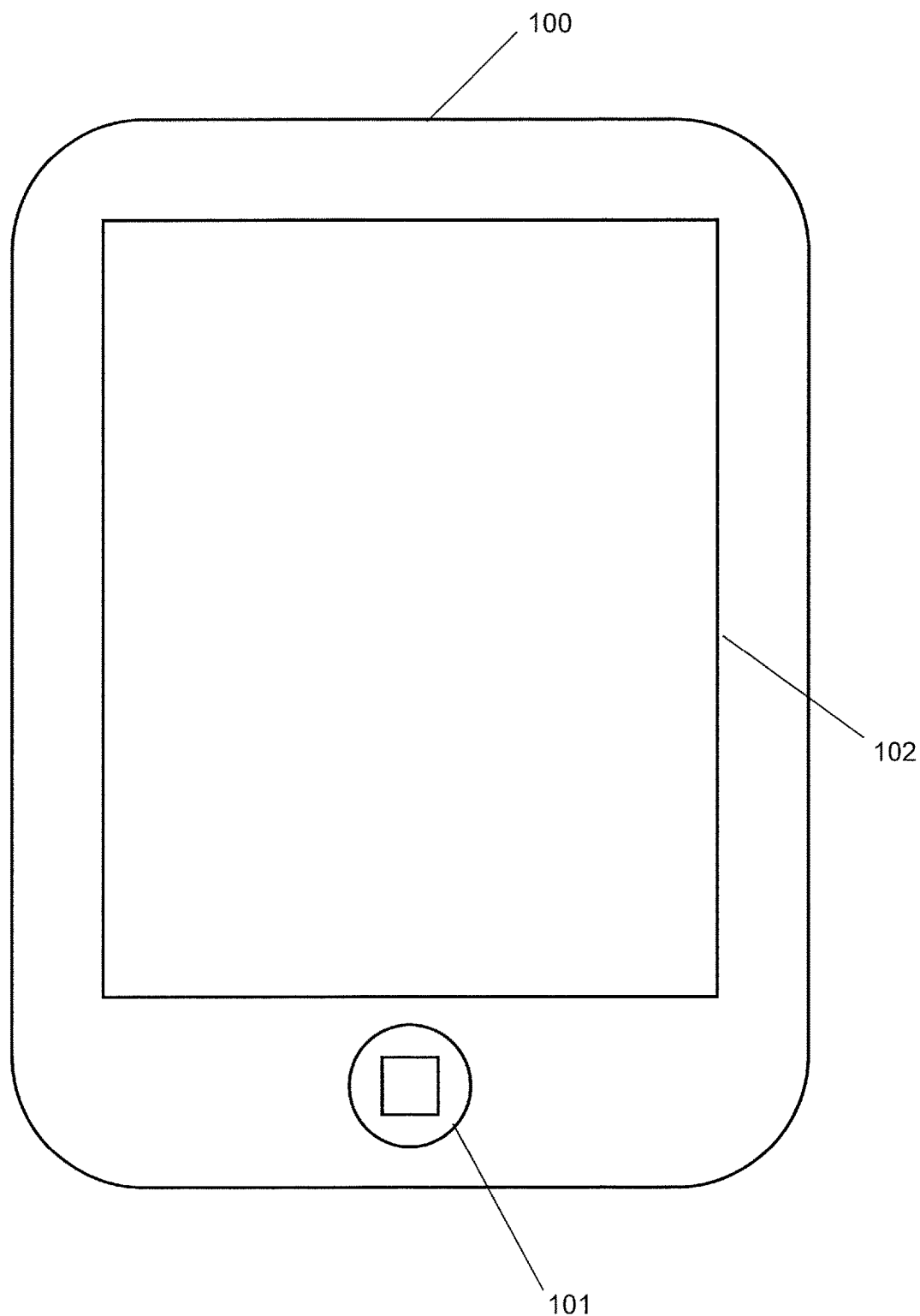
FIG. 1 illustrates the appearance of an information display device as a first embodiment.

FIG. 1 illustrates the appearance of an information display device as a first embodiment. This information display device 100 is a tablet terminal including a power button 101 and a display screen 102. When the power button 101 is pressed down, this information display device 100 is started. A touchscreen panel is attached to the surface of the display screen 102, and this information display device 100 can be operated by manipulating the touchscreen panel attached to the display screen 102.

By executing a computer program defining the operations to be described later (which will be sometimes hereinafter referred to as a "program" or "software"), this information display device 100 can display a car image on the screen as an object. The car image displayed rotates to the right or to the left around an axis of rotation which runs vertically on the screen (i.e., the vertical direction in FIG. 1) when the user swipes his or her finger on the touchscreen to the right or to the left (which will be hereinafter referred to as "swiping").

Figure 2:
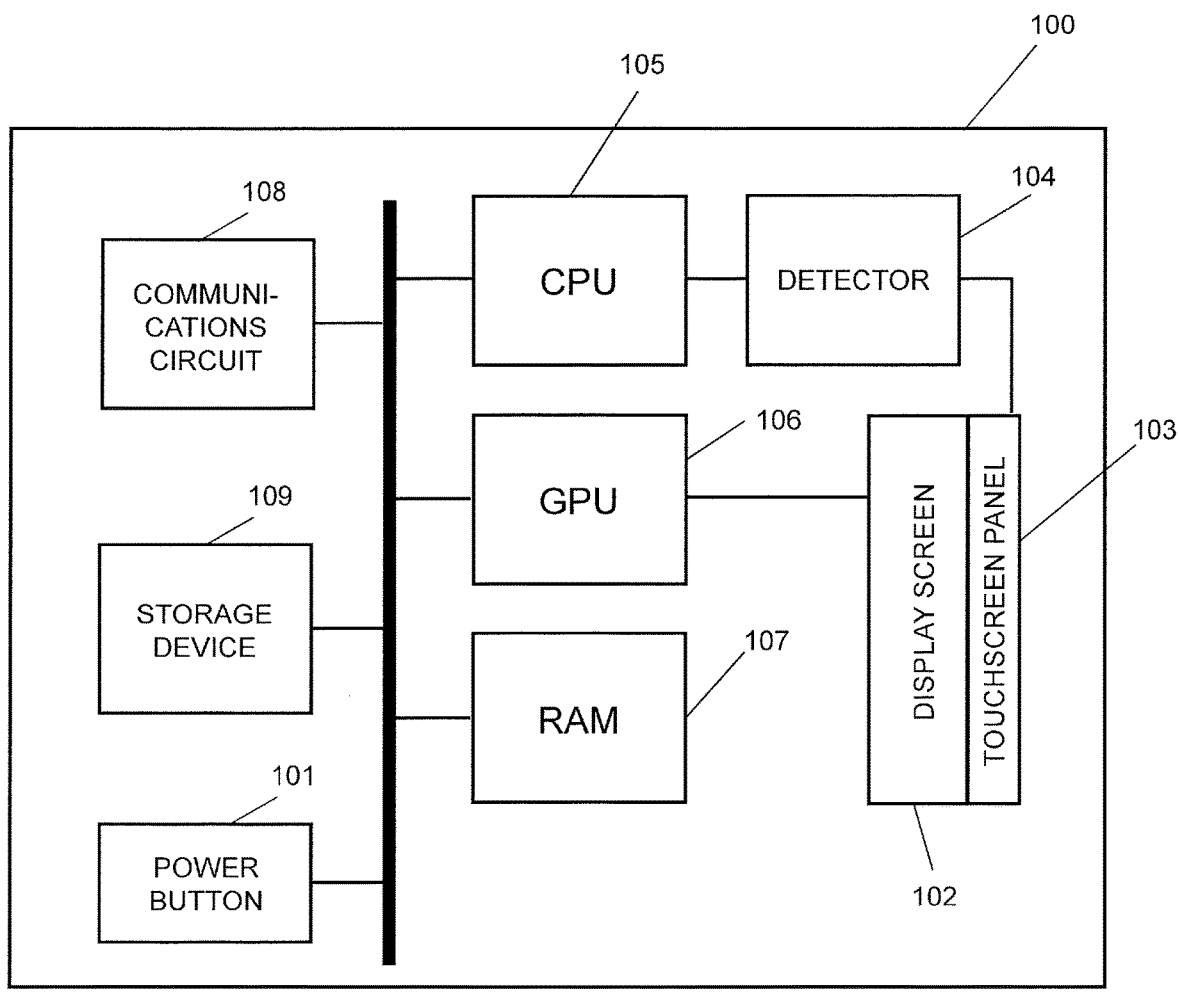
FIG. 2 is a block diagram illustrating an information display device according to the first embodiment.

FIG. 2 is a block diagram illustrating major components of an information display device 100 according to this embodiment. This information display device 100 includes not only the power button 101, display screen 102 and touchscreen panel 103 but also a detector 104, a CPU (central processing unit) 105, a GPU (graphical processing unit) 106, a RAM (random access memory) 107, a communications circuit 108 and a storage device 109.

As described above, the touchscreen panel 103 is arranged in front of the display screen 102. The touchscreen panel 103 is driven by the detector 104 and can sense a user's finger approaching or moving. The touchscreen panel 103 does not have to be attached as an external device to the display screen 102 but may also be an in-cell type in which a touchscreen sensor is built in an LCD panel. The instruction that has been entered through this touchscreen panel 103 is passed to the CPU 105 via the detector 104.

The CPU 105 is a processor which controls the overall operation of this information display device 100 and is connected to the RAM 107, communications circuit 108, storage device 109, power button 101 and detector 104. By executing the program that is stored in the storage device 109, the CPU 105 can perform the operation to be described later while using the RAM 107 as a working memory. In updating the content to be displayed on the display screen 102, the CPU 105 instructs the GPU 106 to update the content to be displayed. Optionally, the CPU 105 may be replaced with some other piece of hardware such as a DSP (digital signal processor) in which a program is installed in a semiconductor circuit.

The GPU 106 is a processor which performs required image processing in accordance with an instruction given by the CPU 105 and displays an image on the display screen 102. Even though the CPU 105 and the GPU 106 are provided separately in this embodiment, these processing units 105 and 106 may be combined together in a single integrated circuit.

The communications circuit 108 is a circuit which communicates with other communications devices over a network. The communications circuit 108 may be hardwired or connected wirelessly to an external device either directly or over a network such as the Internet or a LAN. The communications circuit 108 can get image information from a remote server computer via the Internet or a dedicated line or transmit information about a manipulation that has been done through the touchscreen panel 103.

If a car that is an object is presented as a CG image, the communications circuit 108 may receive data about the car's model or a program to display the car's model on the display screen 102 over a network such as the Internet. Data and program about these models that the communications circuit 108 has received may be stored in the storage device 109.

Alternatively, if a car that is an object is presented as a CG image, the communications circuit 108 may also receive the car's CG image from a server computer (not shown, and which will be hereinafter referred to as a "CG image server") over a network such as the Internet and store the image in the storage device 109. In this case, the communications circuit 108 may transmit information about the angle of rotation that has been determined by the user's manipulation on the touchscreen panel 103 to the CG image server or receive the car's CG image associated with the angle of rotation and store the image in the storage device 109.

Also, if any of a number of photos taken by actually shooting a car is going to be presented as a car image, then the communications circuit 108 may receive those actual shots from a server computer (not show and which will be hereinafter referred to as an "actual shot server") over the Internet and store those shots in the storage device 109. In that case, the communications circuit 108 may receive those shots at a time or may receive some of those shots which are close to the one that is currently displayed on the display screen 102 preferentially. Optionally, the communications circuit 108 may also transmit information about the angle of rotation which has been determined by the user's manipulation to the actual shot server and may receive some of those actual shots of the car that are associated with the angle of rotation.

The storage device 109 may be a hard disk drive or a solid-state drive, for example. The storage device 109 stores various kinds of data including image data to be displayed on the display screen 102 and a program to be executed by the CPU 105. Optionally, the storage device 109 may be configured to be able to read and write from/to a removable storage medium such as an optical disc or a memory card. If a storage device 109 which can read and write from/to a storage medium such as an optical disc is used, the program and image information according to this embodiment may be retrieved from that storage medium.

If a car image is going to be presented as a CG image, then the storage device 109 can store the car's model and a program to display the car's model on the display screen 102. Alternatively, the storage device 109 may also store the car's CG image and a program to display the car's CG image on the display screen 102. On the other hand, if a car image is going to be presented as any of a number of actual shots, then the storage device 109 stores some or all of those actual shots and a program to display those actual shots on the display screen 102. These programs are executed by either the CPU 105 or the GPU 106 to display a target image on the display screen 102.

[1-2. Operation]

Next, it will be described how an information display device 100 according to this embodiment operates.

Figure 3:
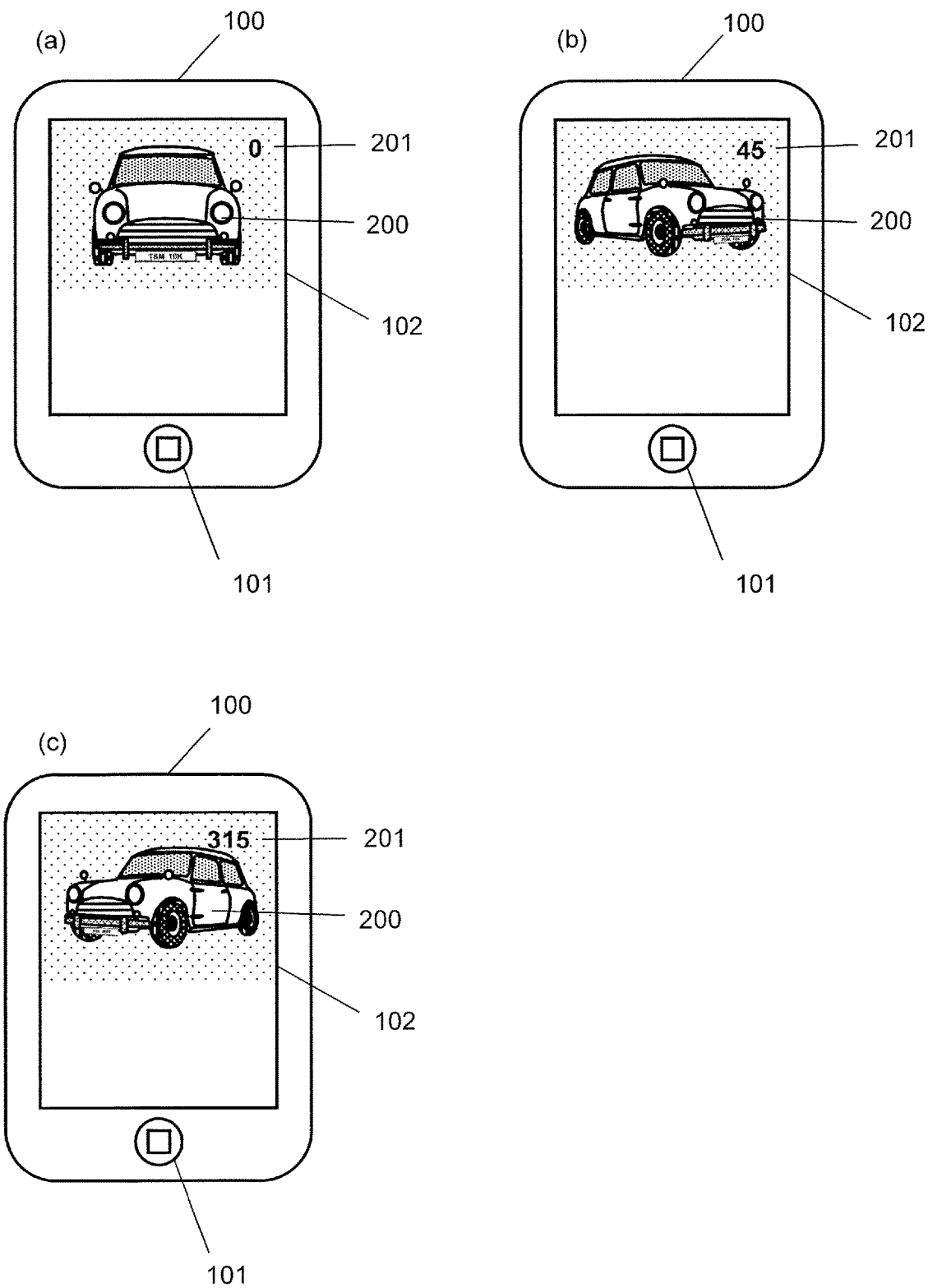
FIG. 3 illustrates what kinds of images may be displayed on the information display device according to the first embodiment.

FIG. 3 illustrates what kinds of images may be displayed on the information display device 100 according to this embodiment. In the upper half of the display area of the display screen 102 (i.e., an area where images such as an object and a manipulator (to be described later) can be displayed), a car image 200 is presented as an object. In FIG. 3(a), the car image 200 faces straight forward (i.e., toward the viewer), and the numeral 201 shown at the upper right corner indicates the angle of rotation from the front to the right. In the state shown in FIG. 3(a), the numeral 201 is "0", which indicates that the car image 200 faces straight forward. If the user swipes his or her finger on the display screen 102 from the left to the right in the state shown in FIG. 3(a), the car image 200 will turn to the right. FIG. 3(b) illustrates a state where the car image 200 has rotated 45 degrees to the right. Thus, the numeral 201 at the upper right corner says "45". On the other hand, if the user swipes his or her finger on the display screen 102 from the right to the left in the state shown in FIG. 3(a), the car image 200 will turn to the left. FIG. 3(c) illustrates a state where the car image 200 has rotated 45 degrees to the left. The numeral 201 at the upper right corner indicates the direction that the car image 200 faces with a clockwise rotating direction supposed to be positive, and therefore, becomes "315" in the state shown in FIG. 3(c).

As can be seen, as the user swipes his or her finger to the right or to the left on the display screen 102, the information display device 100 can rotate the car image 200 being displayed on the display screen 102 to any specified direction. In this case, the rotating direction of the car image 200 depends on the direction in which the user swipes his or her finger on the display screen 102 to the right or to the left, and the angle of rotation is proportional in principle to the amount of right- or leftward movement of the finger on the display screen 102. Specifically, if a location where the swipe manipulation has started is called a "starting location" and a location where the swipe manipulation has ended is called a "destination", then the direction and amount of rotation of the object are determined by a vector to be defined by the distance and direction from the starting location to the destination. It should be noted that even if the internal arithmetic processing of the CPU 105 does not explicitly include a "vector-based" arithmetic operation but if the processing is based on the distance and direction from the starting location to the destination, then such processing can also be regarded herein as "processing of changing the display state of an object based on a vector". Also, the on-screen area where the swipe manipulation is accepted just needs to include an area where the car image 200 is presented as an object. That is to say, the area may be either the entire screen or just the area where the car image 200 is displayed.

Such a manipulation would have no problem at all if the car image 200 should be rotated by as large an angle as 45 degrees, for example. However, if the car image 200 needs to be rotated only slightly or if its rotation should be stopped exactly at 45 degrees, it is difficult to get such a manipulation done in the way described above. If the car image 200 should be rotated by a large angle, then the manipulation would be done more easily by increasing the angle of rotation of the car image 200 with respect to the right- or leftward brushing movement of the finger across the display screen 102. In that case, however, if the car image 200 needs to be rotated just slightly or if its rotation should be stopped at a particular angle, then the ratio of the angle of rotation of the car image 200 to the amount of the right- or leftward brushing movement of the finger across the display screen 102 would be too high to get the manipulation done easily.

Thus, the information display device 100 of this embodiment is configured to operate in not only a "normal manipulation mode" in which the manipulation described above is accepted (and which will be hereinafter referred to as a "first mode") but also a "fine manipulation mode" in which the car image 200 can be easily rotated only slightly (and which will be hereinafter referred to as a "second mode").

Figure 4:
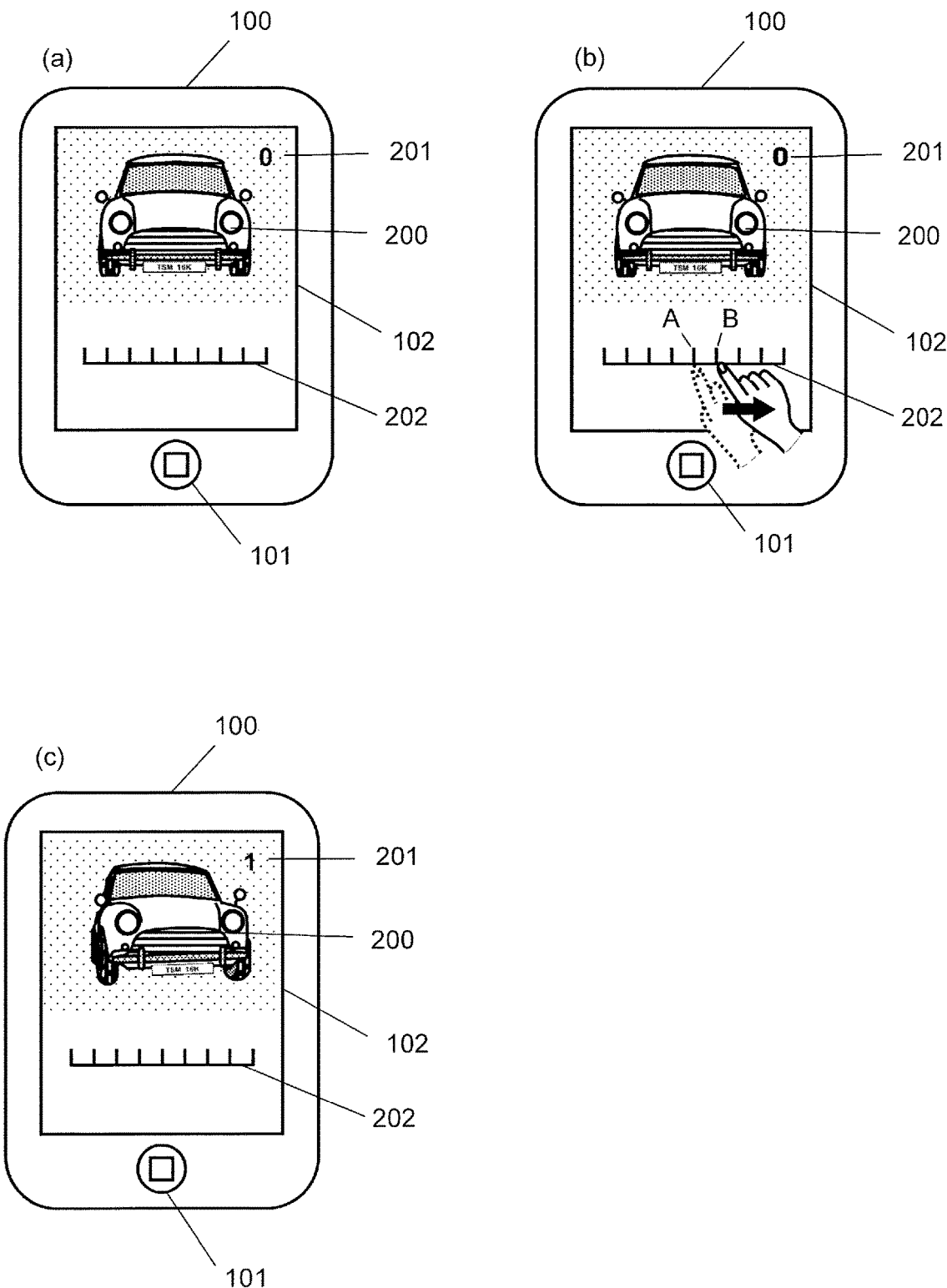
FIG. 4 illustrates what kinds of images may be displayed on the information display device according to the first embodiment.

FIG. 4 illustrates what kinds of images may be displayed in the fine manipulation mode. In the fine manipulation mode, the CPU 105 displays a ruler 202 as a manipulator in the lower half of the display screen 102 as shown in FIG. 4(a). The step interval of the ruler 202 is associated with the minimum angle of rotation (e.g., one degree) of the car image 200 that is an object. For example, suppose the user has done a swipe manipulation from a point A on the ruler 202 to the next point B on the right as shown in FIG. 4(b). In that case, the CPU 105 of the information display device 100 determines that the car image 200 should be rotated by the minimum angle of rotation (i.e., one degree) and rotates the car image 200 as shown in FIG. 4(c). Also, although not shown, suppose the user has done a swipe manipulation from an arbitrary point on the ruler 202 to the second next point on the right. In that case, the CPU 105 of the information display device 100 determines that the car image 200 should be rotated by two degrees which is twice as large as the minimum angle of rotation (i.e., one degree). Furthermore, although not shown, suppose the user has done a swipe manipulation from an arbitrary point on the ruler 202 to the next point on the left. In that case, the CPU 105 of the information display device 100 rotates the car image 200 by the minimum angle of rotation (i.e., one degree) to the left. That is to say, the CPU 105 determines that the car image 200 should be rotated by −1 degree.

As can be seen, in the fine manipulation mode, based on the number n of step intervals on the ruler 202 indicating the distance from the starting location to the destination of the swipe manipulation that has been done by the user on the ruler 202, the angle of rotation of the car image 200 is determined to be n times as large as the minimum angle of rotation. Also, the sign of the angle of rotation of the car image 200 is determined by the direction of the swipe manipulation.

The starting location of the swipe manipulation may be an arbitrary point on the ruler 202. That is to say, the user can start the swipe manipulation from any point on the ruler 202 where he or she finds it easy to start the manipulation. It should be noted that points on the ruler 202 are not associated with the car image 200 as an object but can be displayed independently. And the ruler 202 is not provided in order to align the car image 200 with respect to any point on the ruler 202. That is why the CPU 105 of the information display device 100 may display the ruler 202 in the lower half of the display screen 102 as shown in FIGS. 4(a) to 4(c) or in any other usable area on the display screen 102. Optionally, the ruler 202 may even be displayed so as to be superposed on the car image 200.

In the normal manipulation mode, even if the amount of movement of the swipe manipulation is 1 mm, the angle of rotation of the car image 200 is determined to be 5 degrees, for example. On the other hand, in the fine manipulation mode, if the step interval of the ruler 202 is supposed to be 5 mm, it is not until the amount of movement of the swipe manipulation reaches 5 mm that the angle of rotation of the car image 200 is determined to be one degree that is the minimum angle of rotation of the car image 200. In other words, even if the vector to be defined by the distance and direction from the starting location to the destination specified is the same, the CPU 105 changes the rotation state of the object more finely in the fine manipulation mode than in the normal manipulation mode. As a result, the angle of rotation of the car image 200 can be determined accurately and easily to be a natural number of times as large as one degree that is the minimum angle of rotation of the car image 200.

In this embodiment, the minimum angle of rotation of the car image 200 may be determined in the following manner, for example.

(1) If the car image 200 is going to be presented as a CG image, then the minimum angle of rotation may be determined by the minimum resolution that the car image 200 of the given model has. In that case, the minimum resolution that the car image 200 of the given model has becomes a unit of the resolution that the object has.

(2) If the car image 200 is going to be presented as any of a number of photos that have been actually shot with the object arranged at the origin of a cylindrical coordinate system and with a plurality of cameras which are arranged at an equal distance from the origin shifted by a short distance each time, the minimum angle of rotation may be determined by the amount of shift of the cameras during the shooting session. In that case, the minimum resolution of the car image 200 to be determined by the amount of shift of the cameras becomes a unit of the resolution that the object has.

(3) In any of these situations (1) and (2), if the resolution of the display screen 102 of the information display device 100 or the performance of the GPU 106 is low, then a larger angle than the angle of rotation to be determined in the situation (1) or (2) may be set to be the minimum angle of rotation. In that case, the minimum angle of rotation may be set to be equal to a unit of the resolution that the display screen 102 has. Otherwise, even if the processing of rotating the car image 200 were performed, only a change that exceeds the resolution of the display screen 102 or the resolution to be determined by the performance of the GPU 106 could occur and the rotating processing could have no effects on the display screen 102. That is to say, in that case, even if the user had done a swipe manipulation only by one step interval on the ruler 202, the car image 200 would not rotate.

(4) Still alternatively, an arbitrary angle of rotation which is larger than the one determined in the situation (1), (2) or (3) and which is even smaller than the minimum angle of rotation in the normal manipulation mode may be set to be a unit of change.

Figure 5:
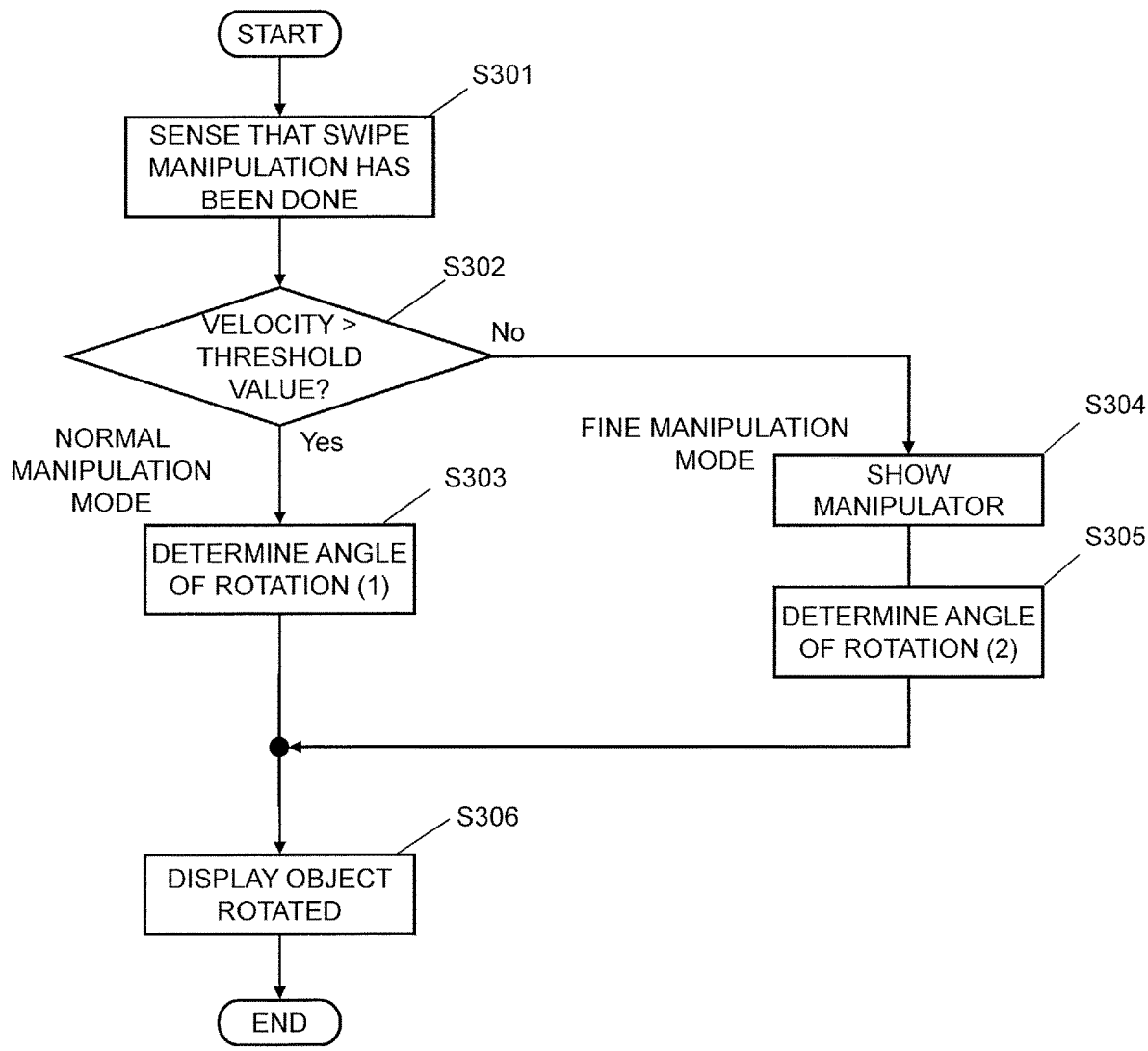
FIG. 5 is a flowchart showing an exemplary procedure of operation of an information display device according to the first embodiment.

FIG. 5 is a flowchart showing an exemplary procedure of operation of an information display device according to this embodiment. The following are operations to be performed in the respective processing steps:

In Step S301, the CPU 105 of the information display device 100 makes the detector 104 sense a swipe manipulation that has been done on the touchscreen panel 103.

In Step S302, the CPU 105 of the information display device 100 compares the velocity of the swipe manipulation to a predetermined threshold value. If the velocity of the swipe manipulation is found to be higher than the predetermined threshold value, then the decision is made that the information display device 100 operate in the normal manipulation mode and the process advances to Step S303. On the other hand, if the velocity of the swipe manipulation is equal to or lower than the predetermined threshold value, then the decision is made that the information display device 100 operate in the fine manipulation mode and the process advances to Step S304. It should be noted that even after the CPU 105 of the information display device 100 has started to operate in the normal manipulation mode, the CPU 105 of the information display device 100 may continuously compare the velocity of the swipe manipulation to the predetermined threshold value. And on finding the velocity of the swipe manipulation to be equal to or lower than the predetermined threshold value, the CPU 105 may change the modes of operation from the normal manipulation mode into the fine manipulation mode.

In Step S303, the CPU 105 of the information display device 100 determines the angle of rotation of the car image 200 by an angle determining algorithm for the normal manipulation mode. Specifically, the CPU 105 determines the angle of rotation of the car image 200 by multiplying the angle of rotation associated with the unit amount of movement of the swipe manipulation that has been set in advance by the amount of movement of the swipe manipulation. The angle of rotation associated with the unit amount of movement of the swipe manipulation may be set to be 5 degrees per millimeter, for example. It should be noted that angle of rotation associated with the unit amount of movement of the swipe manipulation may be either fixed or changed with the velocity of the swipe manipulation as long as the velocity of the swipe manipulation does not become smaller than the predetermined threshold value.

In Step S304, the CPU 105 of the information display device 100 changes the modes of operation into the fine manipulation mode and displays the ruler 202 as a manipulator on the display screen 102. If any input manipulation has been done after that, the process advances to Step S305.

In Step S305, the CPU 105 of the information display device 100 determines the angle of rotation of the car image 200 by an angle determining algorithm for the fine manipulation mode. Specifically, the CPU 105 determines the angle of rotation of the car image 200 by multiplying the angle of rotation associated with the unit amount of movement of the swipe manipulation by the amount of movement of the swipe manipulation. In the fine manipulation mode, the angle of rotation associated with the unit amount of movement of the swipe manipulation may be set to be 1 degree per 5 mm (i.e., the interval between two adjust steps) as described above. Even so, the angle of rotation associated with the unit amount of movement of the swipe manipulation may also be either fixed or changed with the velocity of the swipe manipulation as long as the velocity of the swipe manipulation does not become smaller than the predetermined threshold value.

In Step S306, the CPU 105 of the information display device 100 displays a car image 200 that has been rotated by the angle of rotation determined in either Step S303 or Step S305 on the display screen 102. As a result, in the normal manipulation mode, an image such as the one shown in FIG. 3(b) or 3(c) is displayed. In the fine manipulation mode, on the other hand, if the user has done a swipe manipulation from an arbitrary point A on the ruler 202 to the next point B on the right as shown in FIG. 4(b), an image such as the one shown in FIG. 4(c) is displayed. In the example illustrated in FIG. 4(c), the car image 200 has been rotated by one degree that is the minimum angle of rotation to the right and the numeral at the upper right corner says "1". It should be noted that in FIG. 4(c), the amount of rotation of the car image 200 is exaggerated, compared to the actual angle of rotation of 1 degree, to clearly indicate that the car image 200 has rotated.

Figure 6:
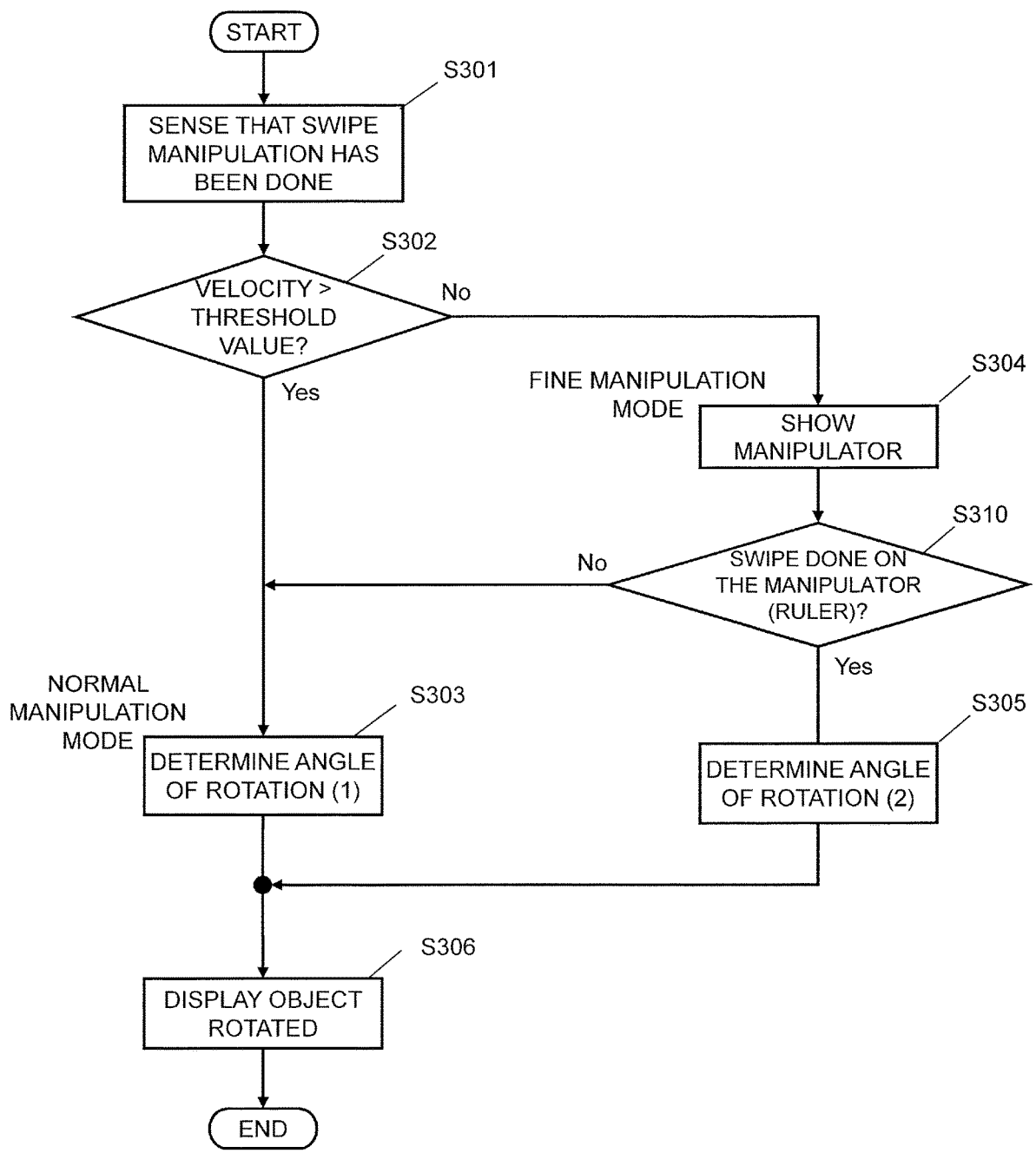
FIG. 6 is a flowchart showing another exemplary procedure of operation of an information display device according to the first embodiment.

It should be noted that in the fine manipulation mode, the swipe manipulation does not always have to be done on the ruler 202. If the user has done a swipe manipulation not on the ruler 202 but anywhere else, the CPU 105 may operate either in the same way as, or differently from, in a situation where the swipe manipulation has been done on the ruler 202. For example, if the user has done the swipe manipulation not on the ruler 202 but anywhere else (e.g., on the object), the CPU 105 may perform the same operation as in the normal manipulation mode. In that case, the CPU 105 performs, after Step S304, Step S310 of determining whether or not the swipe manipulation has been done on the ruler 202 as shown in FIG. 6. If the answer to the query of the processing step S310 is YES, the process advances to Step S305. Otherwise, the process advances to Step S303. In that case, the ruler 202 may be either displayed continuously on the display screen 102 or erased from the screen 102.

[1-3. Effects]

As can be seen from the foregoing description, the information display device 100 of this embodiment operates in the normal manipulation mode (i.e., in the first mode) if the velocity of the swipe manipulation is higher than a predetermined threshold value and operates in the fine manipulation mode (i.e., in the second mode) otherwise. Supposing n is the number of step intervals on the ruler 202 indicating the distance from the starting location to the destination as specified through the swipe manipulation that has been done by the user on the ruler 202, the CPU 105 determines the angle of rotation of the car image 200 to be n times as large as the minimum angle of rotation. The CPU 105 also determines the sign of the angle of rotation of the car image 200 by the direction of the swipe manipulation. In this manner, the angle of rotation of the car image 200 can be determined accurately and easily to be a natural number of times as large as its minimum angle of rotation (of one degree, for example).

As described above, the information display device 100 of this embodiment includes a processor (e.g., the CPU 105) which displays, in the display area of a display screen 102, an object (e.g., the car image 200), of which the display state (e.g., its angle of rotation) is changeable, and a manipulator (e.g., the ruler 202), including a plurality of markers (e.g., the steps on the ruler 202), for use to enter an instruction to change the angle of rotation of the car image 200; and an input interface (e.g., the touchscreen panel 103) which accepts an input manipulation (e.g., the swipe manipulation), including setting a starting location and a destination, in the display area of the display screen 102. The CPU 105 changes the angle of rotation of the car image 200 that is the object in accordance with a vector to be defined by the distance and direction from the starting location of the swipe manipulation to its destination. Also, the CPU 105 is configured to be able to perform a first type of processing of changing the display state of the object in response to the input manipulation that has been done on at least a region in which the car image 200 is displayed and a second type of processing of changing the display state of the object in response to the input manipulation that has been done on at least the ruler 202. When performing the second type of processing, the CPU 105 changes the angle of rotation of the car image 200 more finely in response to the input manipulation that has been done to define the same vector, compared to when performing the first type of processing. As a result, compared to a situation where the information display device 100 operates in only the normal manipulation mode, a fine manipulation on the car image 200 can be done more accurately.

Optionally, the CPU 105 may also be configured to perform the first type of processing not only when an input manipulation has been done on a region where the car image 200 is displayed but also when an input manipulation has been done on at least a part of the region where the manipulator is not shown.

In another embodiment, the CPU 105 hides the ruler 202 from the display screen 102 in the normal manipulation mode and shows the ruler 202 on the display screen 102 only in the fine manipulation mode. According to such an embodiment, since the ruler 202 to support the user's manipulation is shown only when a fine manipulation is needed, the user can see clearly that the modes of operation have been changed.

In still another embodiment, on finding the distance between the starting location and destination that have been set by the swipe manipulation as long as a number of step intervals in the fine manipulation mode, the CPU 105 makes a change in the angle of rotation of the car image 200 so that the change will be a natural number of times (e.g., by 1×) as large as the unit of change (e.g., the minimum angle of rotation). According to such an embodiment, the car image 200 can be rotated only slightly by almost the minimum angle of rotation.

If a swipe manipulation has been done in the fine manipulation mode, then the CPU 105 may change the angle of rotation of the car image 200 more finely compared to a situation where the same input manipulation has been done in the normal manipulation mode, no matter whether the swipe manipulation has been done on the ruler 202 or not. According to such an embodiment, even if no manipulation has been done exactly on the ruler 202 but as long as the mode of operation is the fine manipulation mode, the display state can still be controlled finely.

Also, if a swipe manipulation has been done on the ruler 202 in the fine manipulation mode, the CPU 105 may change the angle of rotation of the car image 200 more finely, compared to a situation where the same input manipulation has been done in the normal manipulation mode. On the other hand, if a swipe manipulation has been done not on the ruler 202 but anywhere else, then the CPU 105 may change the angle of rotation of the car image 200 in the same way as in a situation where the same input manipulation has been done in the normal manipulation mode. According to such an embodiment, even when the ruler 202 is shown, the angle of rotation can be changed as significantly as in the normal manipulation mode.

In yet another embodiment, based on the distance from the starting location to the destination of a swipe manipulation, the CPU 105 determines how much a change to be made in the angle of rotation of the car image 200 should be greater than the minimum angle of rotation, and also determines the direction of rotation of the car image 200 by the direction from the starting location to the destination. According to such an embodiment, it can be seen easily how long the swipe manipulation should be done in order to rotate the car image 200 to an intended degree.

In yet another embodiment, the minimum angle of rotation of the car image 200 is set to be equal to the minimum unit of the resolution that either the car image 200 or the display screen 102 has. According to such an embodiment, the minimum angle of rotation can be as small as possible, and therefore, the car image 200 can be rotated very finely.

In yet another embodiment, the CPU 105 operates in the normal manipulation mode if the velocity of the swipe manipulation is equal to or greater than a preset threshold value but operates in the fine manipulation mode otherwise. According to such an embodiment, the CPU 105 can automatically sense whether or not the user is going to do a fine-tune manipulation and can change the modes of operation into an appropriate one. As a result, this information display device 100 will come in even handier for the user.

Furthermore, the information display device 100 of the embodiment described above includes the display screen 102 and the touchscreen panel 103, which functions as a part of an input interface. As a result, a user interface which is suitable for manipulating on the screen of a touchscreen terminal such as a tablet terminal can be provided.

Embodiment 2

Next, a second embodiment will be described.

[2-1. Configuration]

An information display device 400 according to this embodiment has the same configuration as the information display device 100 of the first embodiment described above. Thus, any component of the information display device 400 of this embodiment having substantially the same function as its counterpart of the information display device 100 of the first embodiment described above will be identified by the same reference numeral as its counterpart's.

[2-2. Operation]

Although the information display device 100 of the first embodiment described above can rotate the car image 200 as an object only to the right or to the left, the information display device 400 of this embodiment can rotate the car image 200 as an object not only to the right and left but also up and down as well. Thus, the user can observe the upper and lower surfaces of the car image 200, too.

Figure 7:
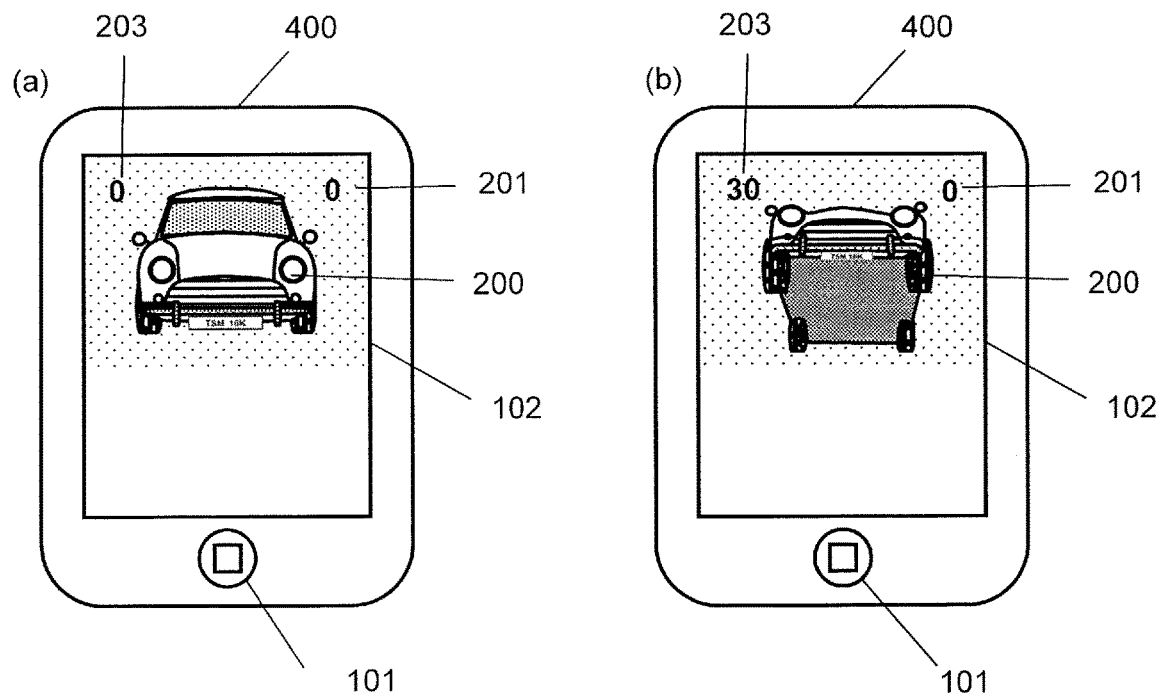
FIG. 7 illustrates what kinds of images may be displayed on an information display device according to a second embodiment.
Figure 7:
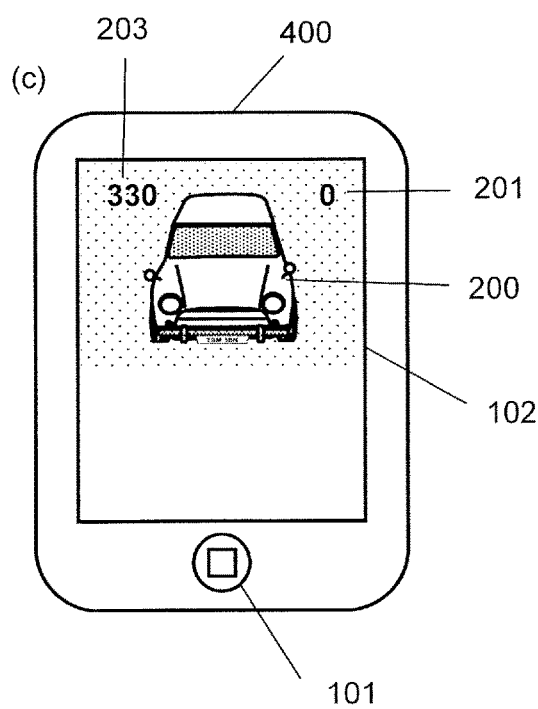

FIG. 7 illustrates what kinds of images may be displayed on the information display device 400 according to this embodiment. In the upper half of the display screen 102, a car image 200 is presented as an object. In FIG. 7(a), the car image 200 faces straight forward (i.e., toward the viewer), and both of the numerals 201 and 203 shown at the upper right and upper left corners, respectively, say "0", which indicates that the car image 200 is now facing straight forward. If the user swipes his or her finger on the display screen 102 from the bottom toward the top in the state shown in FIG. 7(a), the car image 200 will turn upward around an axis of rotation that is the horizontal direction on the screen (which corresponds to the lateral direction on the paper). FIG. 7(b) illustrates a state where the car image 200 has rotated 30 degrees upward. Since the car image 200 has rotated neither to the right nor to the left, the numeral 201 at the upper right corner remains "0" but the numeral 203 at the upper left corner has changed into "30". As can be seen, the numeral 203 at the upper left corner indicates the angle of upward or downward rotation with the upward rotating direction supposed to be positive. On the other hand, if the user swipes his or her finger on the display screen 102 from the top toward the bottom in the state shown in FIG. 7(a), the car image 200 will turn downward. FIG. 7(c) illustrates a state where the car image 200 has rotated 30 degrees downward. Since the car image 200 has rotated neither to the right nor to the left, the numeral 201 at the upper right corner remains "0". But the numeral 203 at the upper left corner indicates the direction that the car image 200 faces with the upward rotating direction supposed to be positive, and therefore, becomes "330" in the state shown in FIG. 7(c).

As can be seen, as the user swipes his or her finger to the right or to the left on the display screen 102, the information display device 400 can rotate the car image 200 being displayed on the display screen 102 to the right or to the left just as specified. In addition, as the user swipes his or her finger up or down on the display screen 102, the information display device 400 can also rotate the car image 200 being displayed on the display screen 102 up or down just as specified.

As can be seen, to cope with not only the right- or leftward rotation but also the up- or downward rotation as well, the car image 200 may be provided as an object in the following manner.

First of all, if the car image 200 is going to be presented as a CG image as in (1) described above, the model of the car image 200 needs to be provided to cope with not only the right- or leftward rotation but also the up- or downward rotation as well.

On the other hand, if the car image 200 is going to be presented as any of a number of actual shots as in (2) described above, then a plurality of photos need to be shot actually with the object arranged at the origin of a spherical coordinate system and with a plurality of cameras which are arranged at an equal distance from the origin shifted by a short distance each time in both the longitudinal and latitudinal directions.

Next, it will be described specifically how this information display device 400 operates. The information display device 400 of this embodiment operates in almost the same way as the information display device 100 of the first embodiment that has already been described with reference to FIGS. 5 and 6, except in the processing step S304 of showing the manipulator and the processing step S305 of determining the angle of rotation in the fine manipulation mode.

Figure 8:
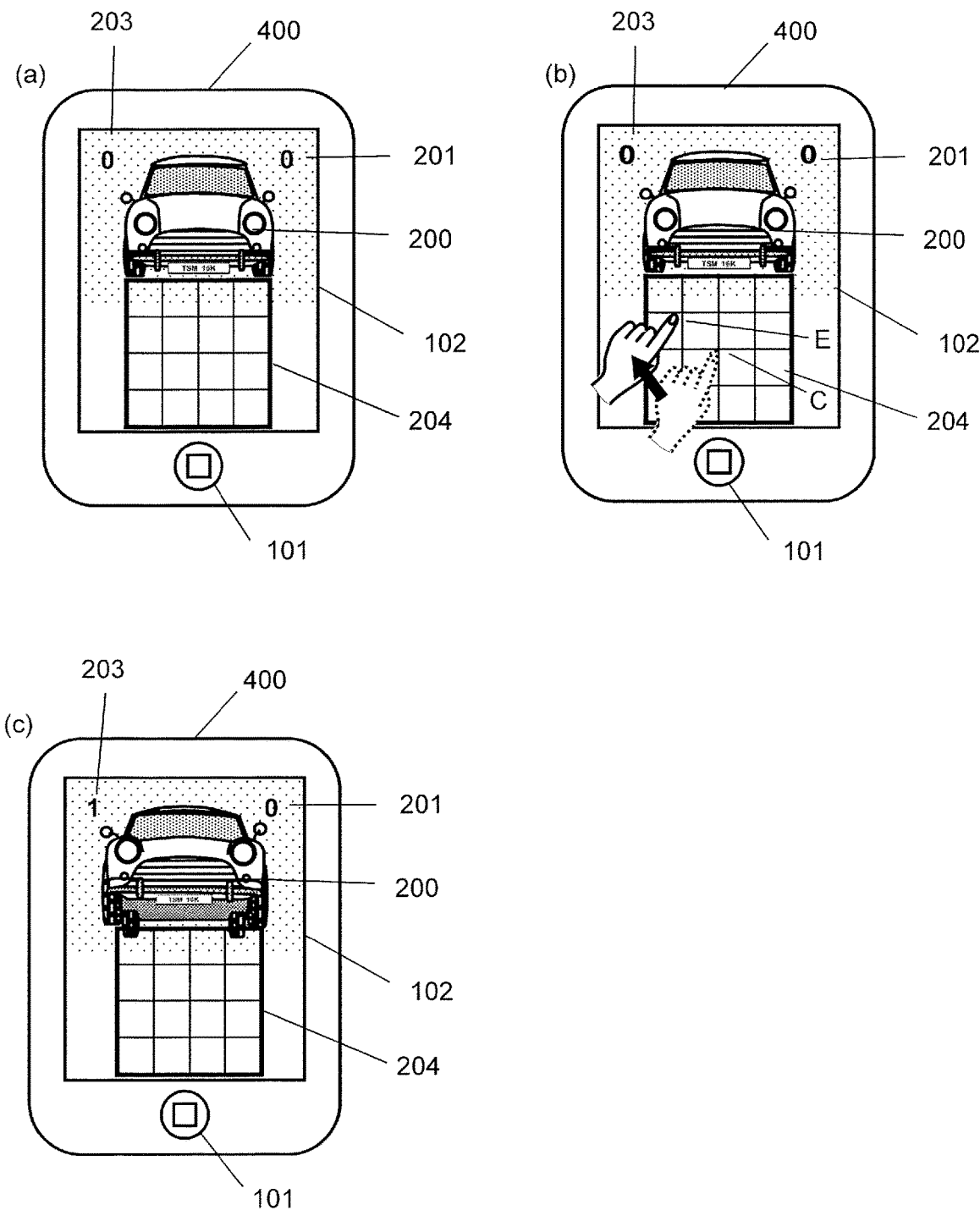
FIG. 8 illustrates what kinds of images may also be displayed on the information display device according to the second embodiment.

FIG. 8 illustrates what kinds of images may also be displayed on the information display device 400 according to this embodiment. In determining the angle of rotation of the car image 200 in the fine manipulation mode, the CPU 105 of this information display device 400 shows a grid 204 in the lower half of the display screen 102 as shown in FIG. 8(a). Suppose the user has swiped his or her finger from an arbitrary point C on the grid 204 to the next point D over the former point as shown in FIG. 8(b). Then, the CPU 105 of the information display device 400 determines the angle of up- or downward rotation of the car image 200 to be 1 degree that is the minimum angle of rotation of the car image 200. Also, although not shown, suppose the user has swiped his or her finger from an arbitrary point on the grid 204 to the second next point over the former point. Then, the CPU 105 of the information display device 400 determines the angle of up- or downward rotation of the car image 200 to be 2 degrees that is twice as large as the minimum angle of rotation of the car image 200. Furthermore, although not shown, suppose the user has swiped his or her finger from an arbitrary point on the grid 204 to the next point under the former point. Then, the CPU 105 of the information display device 400 determines the angle of rotation of the car image 200 to be −1 degree in order to rotate the car image 200 downward by 1 degree that is the minimum angle of rotation of the car image 200.

If the user has swiped his or her finger from an arbitrary point C on the grid 204 to the next point D over the former point as shown in FIG. 8(b), then an image such as the one shown in FIG. 8(c) will be displayed. Since the car image 200 has rotated upward by 1 degree that is the minimum angle of rotation of the car image 200, the numeral 201 at the upper right corner remains "0" but the numeral 203 at the upper left corner changes into "1". It should be noted that in FIG. 8(c), the amount of rotation of the car image 200 is exaggerated, compared to the actual angle of up- or downward rotation of 1 degree, to clearly indicate that the car image 200 has rotated.

As in the information display device 100 of the first embodiment described above, if the user has done a swipe manipulation from an arbitrary point on the grid 204 to the next point on the right, the information display device 400 of this embodiment may also determine the angle of right- or leftward rotation of the car image 200 to be the minimum angle of rotation (e.g., one degree) of the car image 200. Also, suppose the user has done a swipe manipulation from an arbitrary point on the grid 204 to the second next point on the right. In that case, the information display device 400 may determine the angle of right- or leftward rotation of the car image 200 to be two degrees which is twice as large as the minimum angle of rotation (i.e., one degree) of the car image 200. Furthermore, suppose the user has done a swipe manipulation from an arbitrary point on the grid 204 to the next point on the left. In that case, the information display device 400 may determine the angle of right- or leftward rotation of the car image 200 to be −1 degree in order to rotate the car image 200 to the left by one degree that is the minimum angle of rotation of the car image 200.

Figure 9:
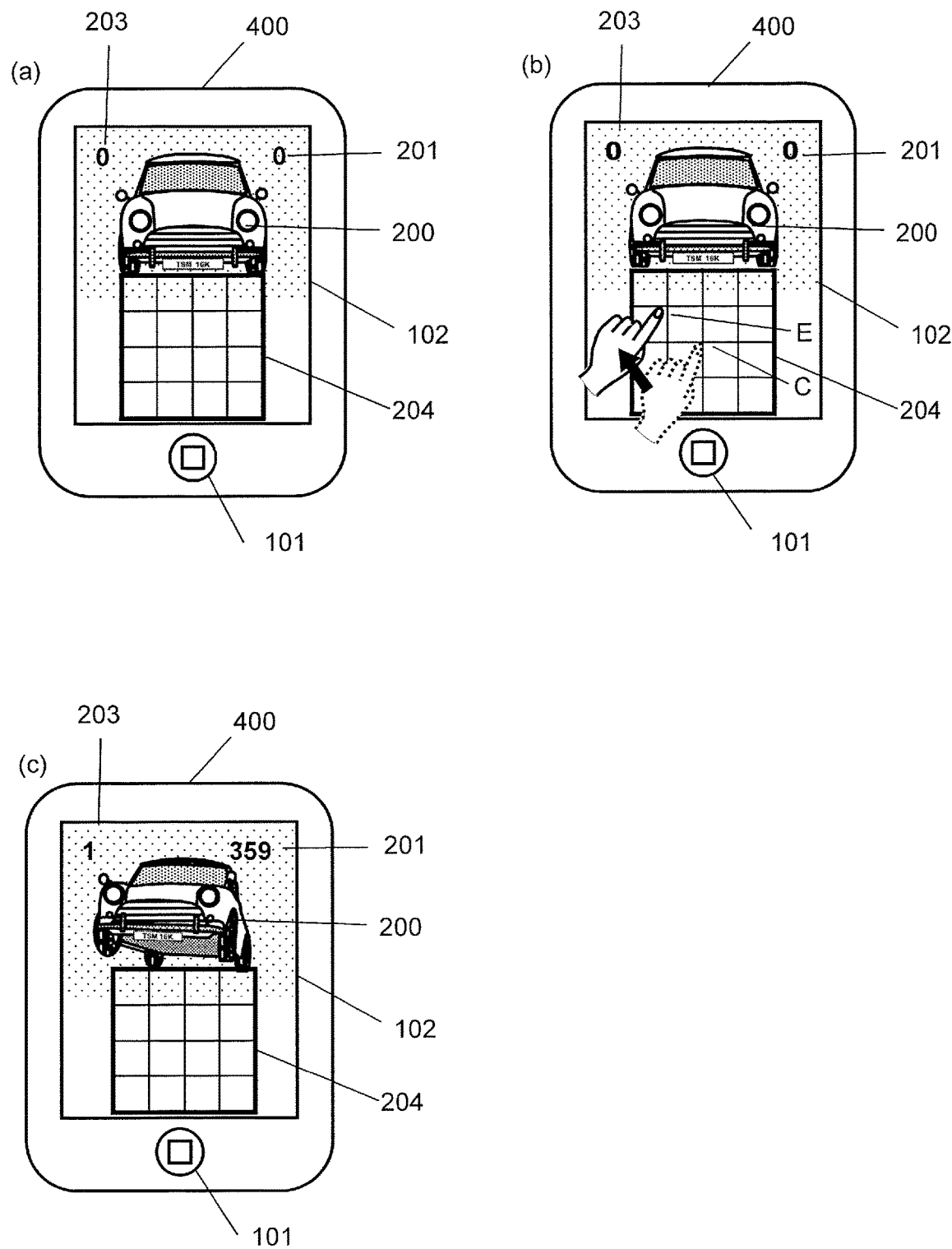
FIG. 9 illustrates what kinds of images may also be displayed on the information display device according to the second embodiment.

Optionally, the information display device 400 may determine the angle of right- or leftward rotation and the angle of up- or downward rotation at the same time. FIG. 9 illustrates what kinds of images may also be displayed on the information display device 400 according to this embodiment. In determining the angle of rotation of the car image 200 in the fine manipulation mode, the CPU 105 of this information display device 400 shows a grid 204 in the lower half of the display screen 102 as shown in FIG. 9(a). Suppose the user has swiped his or her finger in such a state from an arbitrary point C on the grid 204 to a next point E which is located over, and on the left-hand side of, the former point C as shown in FIG. 9(b). Then, the CPU 105 of the information display device 400 determines the angle of up- or downward rotation of the car image 200 to be 1 degree that is the minimum angle of rotation of the car image 200, and also determines the angle of right- or leftward rotation of the car image 200 to be −1 degree that is the minimum angle of rotation of the car image 200.

If the user has swiped his or her finger from an arbitrary point C on the grid 204 to the next point E that is located over, and on the left-hand side of, the former point C as shown in FIG. 9(b), then an image such as the one shown in FIG. 9(c) will be displayed. Since the car image 200 has rotated upward by 1 degree that is the minimum angle of rotation of the car image 200, the numeral 203 at the upper left corner changes into "1". In addition, since the car image 200 has rotated leftward by 1 degree that is the minimum angle of rotation of the car image 200, the numeral 201 at the upper right corner changes into "359". It should be noted that the minimum angle of up- or downward rotation of the car image 200 and the minimum angle of right- or leftward rotation thereof do not always have to be equal to each other. It should be noted that in FIG. 9(c), the amount of rotation of the car image 200 is exaggerated, compared to the actual angle of up- or downward rotation of 1 degree and the actual angle of right- or leftward rotation of 1 degree, to clearly indicate that the car image 200 has rotated both up- or downward and right- or leftward.

[2-3. Effects]

As described above, the information display device 400 of this embodiment determines at least one of the angle of up- or downward rotation of the car image 200 and the angle of right- or leftward rotation of the car image 200 by the number of grid points between the starting location and destination of the swipe manipulation that has been done by the user on the grid 204 in the fine manipulation mode. In this case, the angle of rotation may be determined by multiplying the minimum angle of rotation of the car image 200 by the number of grid points. Also, at least one of the angle of up- or downward rotation of the car image 200 and the angle of right- or leftward rotation of the car image 200 has its sign determined by the direction of the swipe manipulation. As a result, the angle of rotation of the car image 200 can be determined accurately and easily to be a natural number of times as large as the minimum angle of rotation (e.g., 1 degree) both in the up- or downward direction and in the right- or leftward direction. As can be seen, according to this embodiment, the grid 204 is used as a manipulator and a plurality of grid points of the grid 204 are used as a plurality of markers.

Other Embodiments

Although Embodiments 1 and 2 have been described herein as just examples of the technique of the present disclosure, various modifications, replacements, additions or omissions can be readily made on those embodiments as needed and the present disclosure is intended to cover all of those variations. Also, a new embodiment can also be created by combining respective elements that have been described for those embodiments disclosed herein.

Thus, some other embodiments of the present disclosure will be described below.

Although the information display devices 100 and 400 of the first and second embodiments are supposed to be tablet terminals, this is only an example. Rather, an information display device according to the present disclosure is implementable as any other kind of display device as long as the device is configured to be able to display an object so that its display state is readily changeable and to accept an instruction which has been entered through an input device such as a touchscreen panel or a mouse in order to change the display state of the object. For example, an information display device according to the present disclosure may also be a personal computer (PC) or smart phone which adopts a touchscreen panel, a mouse or any other input device. If a mouse is adopted, then every swipe manipulation described above may be replaced with a drag manipulation.

In the first and second embodiments described above, the object is supposed to be a car image 200. However, this is only an example, too. Examples of industrial fields in which an object should be displayed in a changeable display state include a display of a product image in the field of e-commerce. In addition, the present disclosure is also applicable to various academic fields in order to make a user easily understand how a machine or mechanism works or to allow a learner to understand what a human body is like using an anatomical image, for example. As can be seen, the objects to be displayed do not have to be any particular ones.

If the information display device has the ability to display a 3D object, the object may also be a 3D object. In general, a 3D object includes a right-eye object and a left-eye object, and a viewer can view a stereoscopic image by combining those two objects together. It is expected that if a 3D object is displayed, the learner can understand even better how the object works. Such a 3D object may be viewed either only with a pair of dedicated glasses on or with the naked eyes. If any of a number of actual shots is going to be displayed as a car image 200 as in the situation (2) described above, then two adjacent actual shots will have parallax between themselves, and therefore, a 3D object can be displayed.

Figure 10:
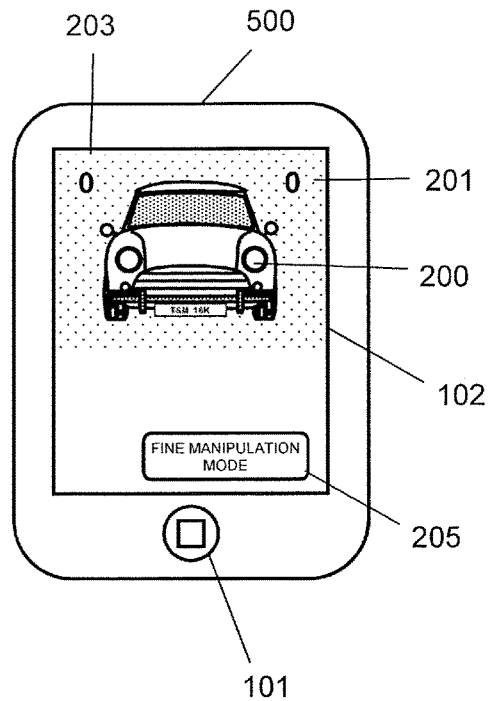
FIG. 10 illustrates what kind of image may be displayed on an information display device according to another embodiment.

In the information display devices 100 and 400 of the first and second embodiments described above, their CPU 105 is supposed to compare the velocity of a swipe manipulation to a predetermined threshold value and enter the normal manipulation mode if the velocity of the swipe manipulation is higher than the predetermined threshold value but enter the fine manipulation mode if the velocity of the swipe manipulation is equal to or lower than the predetermined threshold value. However, this is only an example, too. Alternatively, as shown in FIG. 10, a fine manipulation mode button 205 to change the modes of operation into the fine manipulation mode may be shown on the display screen 102 and the modes of operation may be changed into the fine manipulation mode on sensing that the user has pressed the fine manipulation mode button 205 on the touchscreen panel 103. Still alternatively, an indicator to change the modes of operation from the fine manipulation mode into the normal manipulation mode may also be shown. Yet alternatively, even if the fine manipulation mode button 205 is not shown on the display screen 102, the modes of operation may also be changed into the fine manipulation mode by having the user do a particular kind of manipulation (such as double tapping) on the touchscreen panel 103 attached to the display screen 102. Yet alternatively, when the CPU 105 of the information display device 100, 400 senses the user doing the same kind of rotation manipulation which is at least one of up- or downward rotation and right- or leftward rotation over and over again around a particular angle of a given object, the modes of operation may be automatically changed into the fine manipulation mode. Yet alternatively, on sensing, using an acceleration sensor or an angular velocity sensor, that the user has done a particular kind of manipulation such as shaking the information display device slightly, the modes of operation may be changed into the fine manipulation mode.

Optionally, the CPU 105 does not have to be configured to operate in one of the two modes that are the normal manipulation mode in which no manipulator is shown and the fine manipulation mode in which a manipulator is shown but may also be configured to operate in only the mode in which a manipulator is shown. In that case, the CPU 105 may be configured to change the display state of the object as significantly as in the normal manipulation mode if an input manipulation has been done in at least a part of the display area of the display screen except on the manipulator (e.g., on the region where the object is displayed). On the other hand, the CPU 105 may be configured to change the display state of the object as finely as in the fine manipulation mode if an input manipulation has been done on at least the manipulator. Even when such a configuration is adopted, a normal manipulation on an object and a fine manipulation using a manipulator can be done selectively depending on the situation.

The information display devices 100 and 400 of the first and second embodiments described above are supposed to determine the angle of rotation of the car image 200 by either the number of steps or the number of grid points between the starting point and destination of a swipe manipulation that the user has done on either the ruler 202 or the grid 204. And the information display devices 100 and 400 are supposed to determine the sign of the angle of rotation of the car image 200 by the direction of the swipe manipulation. However, the technique of the present disclosure is not limited to such particular embodiments. For example, instead of doing the swipe manipulation, the first point of touch may be set to be the starting point and the second point of touch may be set to be the destination as well. If a mouse is used as an input interface instead of the touchscreen panel, the first point of clicking may be set to be the starting point and the second point of clicking may be set to be the destination. In this manner, the fine manipulation that has already been described for the first and second embodiments may also get done by making either tapping or clicking on two of a plurality of markers that are included in the manipulator.

Figure 11:
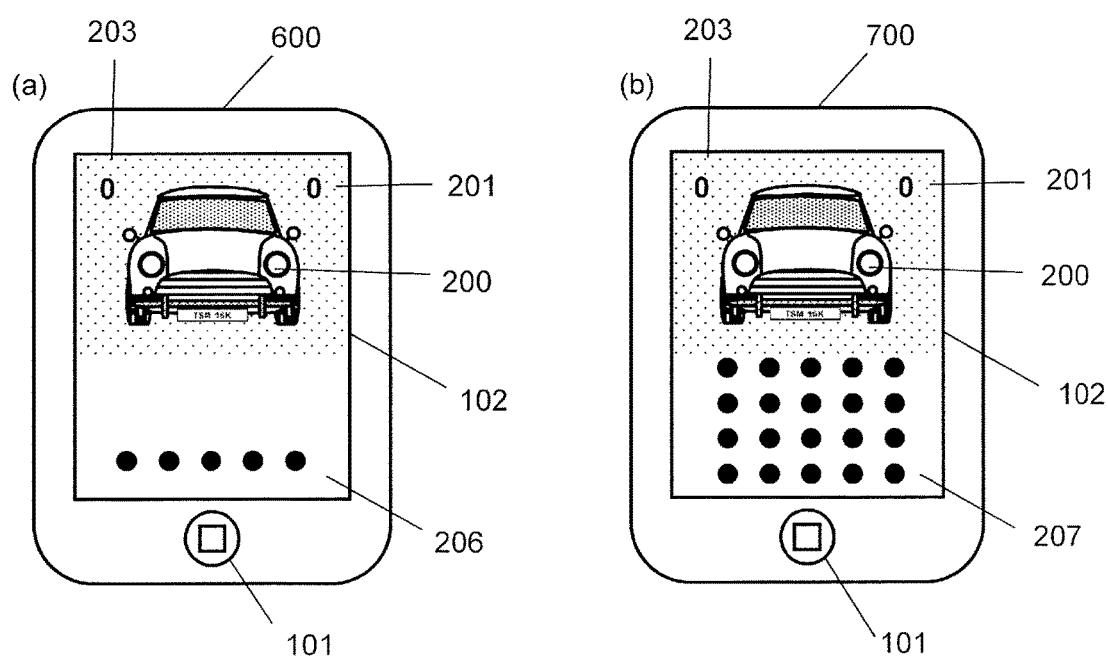
FIG. 11 illustrates what kinds of images may be displayed on an information display device according to still another embodiment.

Optionally, only a plurality of dots 206 may be shown instead of the ruler 202 as shown in FIG. 11(*a*). Or only a plurality of dots 207 may be shown instead of the grid 204 as shown in FIG. 11(*b*). In short, any manipulator may be used as long as the indicator allows the user to specify the distance and direction between two points such as the number of steps or grid points. In other words, the markers of the manipulator may be shown in various forms including dots, a ruler, grid points and marks.

In the first and second embodiments described above, the car image 200 as an object is supposed to be just rotated. However, this is only an example. An information display device, information display method and information display program according to embodiments of the present disclosure allows the user to change a state of a given object accurately and easily by a natural number of times as large as the minimum unit of change of that object. That is why the change of its state does not have to be rotation but may also be zooming up or out, moving, or deformation as well. However, as the object is zoomed in or out, then the minimum unit of change of the object's size also increases or decreases accordingly. That is why the minimum unit of change of the object that has been zoomed in or out needs to be obtained based on the minimum unit corresponding to the reference size of the object.

If an image including an object is an image which has been shot with a light-field camera, for example, then a change in focusing state is also included in various changes in the display state of the object. As is well known in the art, an image which has been shot with a light field camera includes multiple pieces of image information in mutually different focusing states (or with multiple different focal lengths), and the focusing state of such an image can be changed (i.e., re-focused) after the image has been shot. Since it is also difficult to get a fine manipulation done accurately when the focusing state needs to be changed in that way, a manipulator according to the present disclosure can be used effectively in such a situation, too.

The information display device may be configured to be able to rotate, zoom in or out, move, or deform a given object, change its focal length or change any of various other kinds of states of the object. If the information display device can change any of such various kinds of states, then the user may be allowed to specify what kind of state is going to be changed in order to clearly indicate the specific kind of state to be changed next by the manipulation he or she is going to do. For example, the user may be allowed to determine the kind of the state to be changed in advance using a button or menu which is shown on the display 102.

Figure 12:
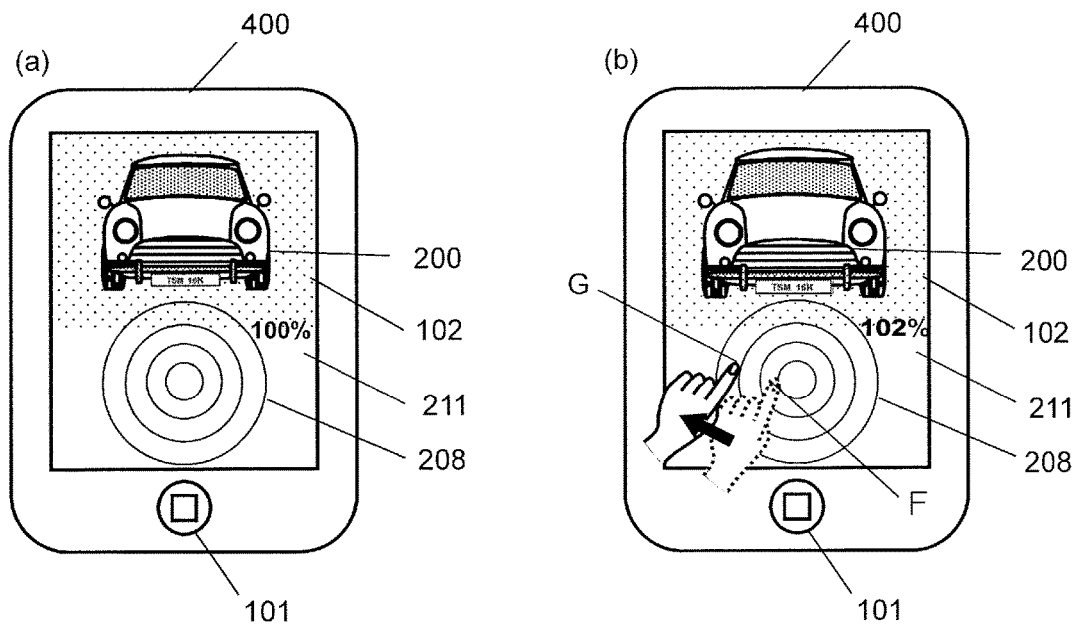
FIG. 12 illustrates what kinds of images may be displayed on an information display device according to yet another embodiment.

FIG. 12 illustrates another exemplary manipulator. As shown in FIG. 12(a), this alternative manipulator has a plurality of concentric circles 208 as markers and can be used effectively to zoom in or out a given object. The numeral 211 shown beside the manipulator indicates the zoom power of the car image 200 as an object. If the user has done a swipe manipulation from a point F on the innermost circle to a point G on the second next outer circle as shown in FIG. 12(b), then the car image 200 as an object is zoomed in. In that case, the numeral 211 increases by 2% which is twice as large as the unit of zooming (which is supposed to be 1% in this example) and changes into 102%. Although not shown, if a swipe manipulation has been done from an outer point to an inner point in the opposite direction from the example just described, then the object is zoomed out. Although the user is supposed to do a swipe manipulation in this example, the same result can also be obtained by doing pinching.

Figure 13:
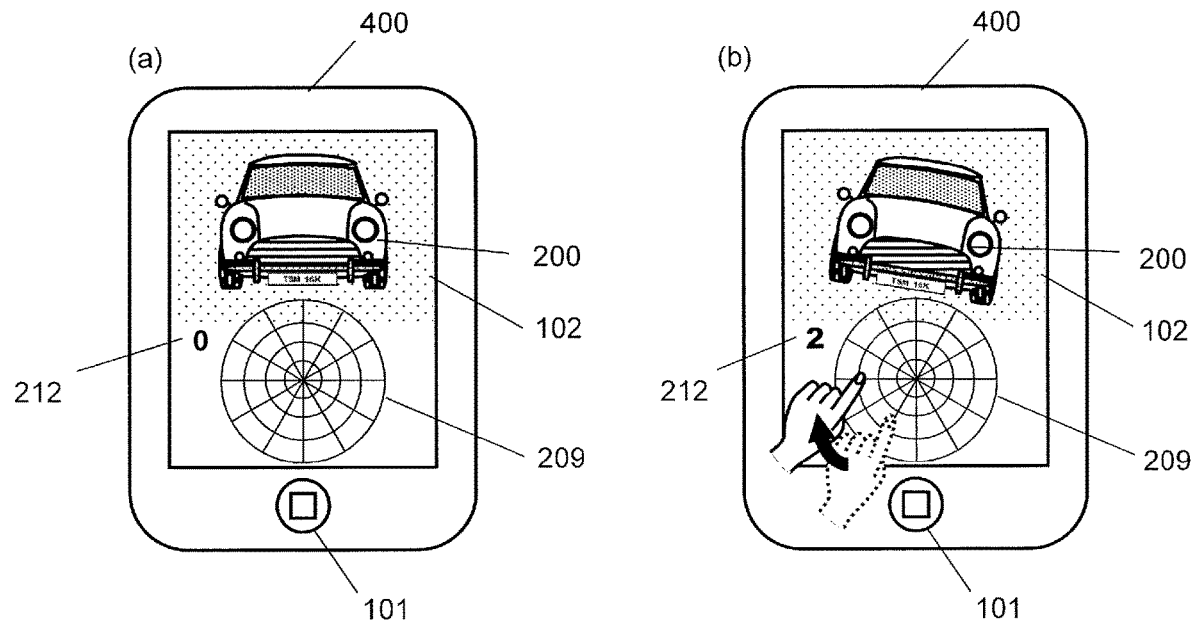
FIG. 13 illustrates what kinds of images may be displayed on an information display device according to yet another embodiment.

FIG. 13 illustrates still another exemplary manipulator. As shown in FIG. 13(a), this alternative manipulator has not only a plurality of concentric circles but also radial lines 209 as markers and can be used effectively to rotate a given object around an axis of rotation which runs in the direction coming out of the screen, for example. The numeral 212 shown beside the manipulator indicates the angle of clockwise rotation. If the user swipes his or her finger clockwise from a line to another line, then the car image 200 as an object rotates and the numeral 212 changes from "0" into "2" as shown in FIG. 13(b). Although not shown, if the user has swiped his or her finger counterclockwise, then the car image 200 rotates counterclockwise. In this example, the user may do a manipulation of rotating the display screen with two of his or her fingers.

As described above, the manipulator may be implemented in various forms. In any case, the manipulator just needs to allow the user to specify the distance and direction between two points. Such a manipulator will allow the user to determine, by the distance between the two points, how much a change to be made to a given object should be greater than a unit of change, and to determine the direction of change of the object (e.g., whether it should be rotated clockwise or counterclockwise, moved rightward or leftward, zoomed in or out, or have its focal length increased or decreased) by the direction from the starting location to the destination.

The technique of the present disclosure is applicable to software (program) which defines the processing of the embodiments described above. The operations defined by such a program may be as shown in FIGS. 5 and 6, for example. Such a program may be not only distributed by being recorded in a removable storage medium but also downloaded through telecommunications lines. By making a processor built in a device execute such a program, various operations that have already been described for embodiments of the present disclosure can get done. Optionally, a server computer set up at a data center or any other location may provide the information display method of the present disclosure in the form of so-called "cloud services" at a client terminal's request. In processing data of a huge size such as a 3D object, high processing performance is required. That is why the cloud services provided by a server computer with high processing performance will work efficiently in such a situation.

Various embodiments that the present inventors believe to be best modes and other embodiments have been described by providing the accompanying drawings and a detailed description for that purpose. This has been done just to provide illustrative examples of the subject matters defined by the appended claims for those skilled in the art by referring to some particular embodiments. That is why the elements illustrated on those drawings and/or mentioned in the foregoing description include not only essential elements that need to be used to overcome the problems described above but also other inessential elements as well. Therefore, please do not make a superficial decision that those inessential additional elements are indispensable ones simply because they are illustrated or mentioned on the drawings or the description. Also, the embodiments disclosed herein can be subjected to various modifications, replacements, additions or omissions as long as those variations fall within the scope of the present disclosure as defined by the appended claims and can be called equivalents.

The present disclosure is applicable to an information display device which can display an object in a changeable display state. Specifically, the present disclosure may be used in tablet terminals, smartphones, PCs and server computers, for example.

While the present disclosure has been described with respect to preferred embodiments thereof, it will be apparent to those skilled in the art that the disclosed disclosure may be modified in numerous ways and may assume many embodiments other than those specifically described above. Accordingly, it is intended by the appended claims to cover all modifications of the disclosure that fall within the true spirit and scope of the disclosure.

What is claimed is:

1. An information display device comprising:
   a display screen including a display area with an object image having a changeable display state displayed, and the display screen is configured to accept a user swipe manipulation occurring over a duration of time from a starting location towards an ending location, with a velocity of the user swipe manipulation is measured over the duration of time from the starting location towards the ending location in the display area, and
   a processor configured to:
   when the velocity of the user swipe manipulation is more than a predetermined threshold value:
     rotate the object image with a first angle velocity by a unit amount of movement of a user input manipulation in the display area to rotate the object image;
   when the velocity of the user swipe manipulation is less than the predetermined threshold value:
     cause the display screen to display in the display area an additional manipulator area;

a user input manipulation is received in the manipulator area to rotate the object image, after the manipulator area is displayed in the display area;
rotate the object image with a second angle velocity by the unit amount of movement of the user input manipulation in the manipulator area to rotate the object image;
for the unit amount of movement of the input manipulation to rotate the object image, the first angle velocity is larger than the second angle velocity to rotate the object image in the display area.

2. The information display device of claim 1, wherein the processor is configured to change the changeable display state of the object according to the first angle velocity in which the manipulator area is hidden from the display area of the display screen and to change the changeable display state of the object according to the second angle velocity in which the manipulator area is shown in the display area of the display screen.

3. The information display device of claim 1, wherein while the manipulator area is being shown in the display area of the display screen, the processor changes the changeable display state of the object according to the first angle velocity when the user input manipulation area has been done on a region of the display area where the object is being displayed, and change the display state of the object according to the second angle velocity when the user input manipulation has been done on the manipulator area.

4. The information display device of claim 1, wherein:
the manipulator area includes a plurality of markers and the plurality of markers are arranged at an interval, and
while changing the changeable display state of the object according to the second angle velocity and when the distance between the starting location and the destination of the input manipulation is as long as the interval between the plurality of markers, the processor changes the changeable display state of the object such that the change in the changeable display state is a natural number of times larger than a predetermined unit amount of change of the object.

5. The information display device of claim 1, wherein the processor is configured to:
based on the distance between the starting location and the destination, determine an amount of change to the changeable display state of the object that is greater than a predetermined unit amount of change; and
determine the direction of change in the changeable display state of the object by the direction from the starting location toward the destination.

6. The information display device of claim 1, wherein the manipulator area includes a plurality of markers and each of the plurality of markers in the manipulator area is selected from the group consisting of dots, a ruler and grid points.

7. The information display device of claim 1, wherein a predetermined unit amount of change made to the changeable display state of the object is equal to a minimum unit of resolution of either the object or the display screen.

8. The information display device of claim 1, wherein the processor is configured to display, on the display screen, a mode switching indicator indicating that the modes of operation be changed from changing the changeable display state of the object according to the first angle velocity in which the manipulator is hidden from the display area into changing the display state of the object according to the second angle velocity in which the manipulator is shown in the display area, or vice versa, and change the modes of operation from one of using the first angle velocity and second angle velocity into the other one in response to an instruction that has been entered with the mode switching indicator.

9. The information display device of claim 1, wherein the object includes at least one image selected from the group consisting of a human body anatomy image, a machine or mechanism image, and an e-commerce product image.

10. The information display device of claim 1, further comprising the display screen,
wherein the display screen includes a touchscreen panel attached to the display screen.

11. An information display method comprising:
accepting a user swipe manipulation occurring over a duration of time from a starting location towards an ending location of a display screen including a display area with an object image having a changeable display state displayed;
measuring a velocity of the user swipe manipulation over the duration of time from the starting location towards the ending location in the display area, and
when the velocity of the user swipe manipulation is more than a predetermined threshold value:
rotating the object image with a first angle velocity by a unit amount of movement of a user input manipulation in the display area to rotate the object image;
when the velocity of the user swipe manipulation is less than the predetermined threshold value:
causing the display screen to display in the display area an additional manipulator area;
receiving a user input manipulation in the manipulator area to rotate the object image, after the manipulator area is displayed in the display area; and
rotating the object image with a second angle velocity by the unit amount of movement of the user input manipulation in the manipulator area to rotate the object image;
wherein, for the unit amount of movement of the input manipulation to rotate the object image, the first angle velocity is larger than the second angle velocity to rotate the object image in the display area.

12. A non-transitory computer-readable medium storing a computer program to be executed by a computer, the program causing the computer to:
accept a user swipe manipulation occurring over a duration of time from a starting location towards an ending location of a display screen including a display area with an object image having a changeable display state displayed;
measure a velocity of the user swipe manipulation over the duration of time from the starting location towards the ending location in the display area, and
when the velocity of the user swipe manipulation is more than a predetermined threshold value:
rotate the object image with a first angle velocity by a unit amount of movement of a user input manipulation in the display area to rotate the object image;
when the velocity of the user swipe manipulation is less than the predetermined threshold value:
cause the display screen to display in the display area an additional manipulator area;
receive a user input manipulation in the manipulator area to rotate the object image, after the manipulator area is displayed in the display area; and rotate the object image with a second angle velocity by the unit amount of movement of the user input manipulation in the manipulator area to rotate the object image;

wherein, for the unit amount of movement of the input manipulation to rotate the object image, the first angle velocity is larger than the second angle velocity to rotate the object image in the display area.

\* \* \* \* \*